United States Patent
Cheng et al.

(10) Patent No.: US 11,151,206 B2
(45) Date of Patent: Oct. 19, 2021

(54) METHOD AND APPARATUS FOR PUSHING INFORMATION

(71) Applicant: Baidu Online Network Technology (Beijing) Co., Ltd., Beijing (CN)

(72) Inventors: Jun Cheng, Beijing (CN); Jia Gui, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 192 days.

(21) Appl. No.: 16/149,816

(22) Filed: Oct. 2, 2018

(65) Prior Publication Data

US 2019/0114363 A1   Apr. 18, 2019

(30) Foreign Application Priority Data

Oct. 17, 2017 (CN) .......................... 201710966393.5

(51) Int. Cl.
*G06F 16/9535* (2019.01)
*G06F 16/54* (2019.01)
*G06F 16/215* (2019.01)
*G06F 16/958* (2019.01)
*G06F 16/583* (2019.01)
(Continued)

(52) U.S. Cl.
CPC ........ *G06F 16/9535* (2019.01); *G06F 16/215* (2019.01); *G06F 16/54* (2019.01); *G06F 16/5846* (2019.01); *G06F 16/958* (2019.01); *G06F 16/9558* (2019.01); *H04L 67/26* (2013.01); *H04L 67/02* (2013.01)

(58) Field of Classification Search
CPC .... G06F 16/9535; G06F 16/54; G06F 16/215; G06F 16/958; G06F 16/5846; G06F 16/9558; H04L 67/26; H04L 67/02
USPC .......................................... 707/737, 692, 765
See application file for complete search history.

(56) References Cited

U.S. PATENT DOCUMENTS 8,751,516 B1 * 6/2014 Wong .................... G06F 16/248
                                                     707/758
10,706,098 B1 * 7/2020 Ramesh ................ G06F 40/247
(Continued)

FOREIGN PATENT DOCUMENTS

CN        102609433 A     7/2012
CN        102930022 A     2/2013
(Continued)

*Primary Examiner* — Michael Pham
(74) *Attorney, Agent, or Firm* — von Briesen & Roper, s.c.

(57) ABSTRACT

A method and apparatus for pushing information are provided. A specific embodiment of the method includes: sending, in response to receiving first search query sent by a terminal, a search result page including at least one image matching the first search query to the terminal, for a user to select a to-be-browsed target image from the at least one image, the target image being linked to a detail page having a search function including the target image; acquiring, in response to receiving a request for browsing the target image sent by the terminal, the detail page linked to the target image; generating recommendation information based on the target image and the first search query, and adding the recommendation information to the detail page; and pushing the detail page having the added recommendation information to the terminal. This embodiment realizes a targeted information push.

15 Claims, 6 Drawing Sheets

(51) Int. Cl.
*G06F 16/955* (2019.01)
*H04L 29/08* (2006.01)

(56) References Cited

U.S. PATENT DOCUMENTS

| | | | |
|---|---|---|---|
| 2010/0161605 A1* | 6/2010 | Gabrilovich | G06Q 30/02 707/736 |
| 2010/0250336 A1* | 9/2010 | Selinger | G06Q 30/0643 705/26.7 |
| 2011/0016108 A1* | 1/2011 | Pelenur | G06F 16/951 707/722 |
| 2012/0239679 A1* | 9/2012 | Gupta | G06F 16/90324 707/767 |
| 2014/0289214 A1* | 9/2014 | Wong | G06F 16/248 707/706 |
| 2014/0310255 A1* | 10/2014 | Cardell | G06F 16/5866 707/706 |
| 2018/0239798 A1* | 8/2018 | Gupta | G06F 16/2425 |

FOREIGN PATENT DOCUMENTS

| | | |
|---|---|---|
| CN | 102968413 A | 3/2013 |
| CN | 103077217 A | 5/2013 |
| CN | 104063454 A | 9/2014 |
| CN | 104765809 A | 7/2015 |

\* cited by examiner

200

```
┌─────────────────────────────────────────────────────────┐
│ Sending, in response to receiving first search query    │──── 201
│ sent by a terminal, a search result page comprising at  │
│ least one image matching the first search query to the  │
│ terminal, for a user to select a to-be-browsed target   │
│ image from the at least one image                       │
└─────────────────────────────────────────────────────────┘
                          │
                          ▼
┌─────────────────────────────────────────────────────────┐
│ Acquiring, in response to receiving a request for       │──── 202
│ browsing the target image sent by the terminal, the     │
│ detail page linked to the target image                  │
└─────────────────────────────────────────────────────────┘
                          │
                          ▼
┌─────────────────────────────────────────────────────────┐
│ Generating recommendation information based on the      │──── 203
│ target image and the first search query, and adding     │
│ the recommendation information to the detail page       │
└─────────────────────────────────────────────────────────┘
                          │
                          ▼
┌─────────────────────────────────────────────────────────┐
│ Pushing the detail page having the added recommendation │──── 204
│ information to the terminalPushing to the terminal the  │
│ detail page after addingadded with the recommendation   │
│ information                                             │
└─────────────────────────────────────────────────────────┘
```

Fig. 2

METHOD AND APPARATUS FOR PUSHING INFORMATION

CROSS-REFERENCE TO RELATED APPLICATIONS

This application claims priority to Chinese Patent Application no. 201710966393.5, filed with the China National Intellectual Property Administration (CNIPA) on Oct. 17, 2017, the contents of which are incorporated herein by reference in their entirety.

TECHNICAL FIELD

Embodiments of the present disclosure relate to the field of computer technology, specifically to the field of Internet technology, and more specifically to a method and apparatus for pushing information.

BACKGROUND

At present, with the continuous development of the Internet technology, users' needs for search engines are no longer met with only searching for text. Many users also want to search for images on the web through search engines.

During the image search, a recommendation engine recommends a set of recommendation information related to the search query to the user. The set of recommendation information comes from the set of the search query that all users have searched for, and is used to mine the user's points of interest, thereby increasing the user traffic for commercial search engines.

The search result page of the existing image searching includes all the search results related to the search query, and the set of recommendation information usually relies on the search query for recommendation. The detail page of the image search result is the page that the user jumps to after clicking on an image on the search result page, and the detail page includes more information related to the search query and the image, such as a summary and a URL link of the image source. Usually, the set of recommendation information may also be displayed on this page. In general, the set of recommendation information of the detail page and the set of search result page recommendation information are homologous, and have completely identical data.

SUMMARY

The objective of embodiments of the present disclosure is to provide a method and apparatus for pushing information.

In a first aspect, the embodiments of the present disclosure provide a method for pushing information, including: sending, in response to receiving first search query sent by a terminal, a search result page including at least one image matching the first search query to the terminal, for a user to select a to-be-browsed target image from the at least one image, the target image being linked to a detail page having a search function including the target image; acquiring, in response to receiving a request for browsing the target image sent by the terminal, the detail page linked to the target image; generating recommendation information based on the target image and the first search query, and adding the recommendation information to the detail page; and pushing the detail page having the added recommendation information to the terminal.

In some embodiments, the generating recommendation information based on the target image and the first search query includes: recognizing contents of the target image to obtain at least one text and a confidence coefficient of each of the at least one text; and determining, from the at least one text, the text different from the first search query and having the confidence coefficient greater than a predetermined first confidence coefficient threshold as the recommendation information.

In some embodiments, the generating recommendation information based on the target image and the first search query includes: querying at least one second search query and a number of searches for each the second search queries by using a preset recommendation information table, wherein the recommendation information table is used to represent a corresponding relationship between the at least one second search query used in searching on the detail page including the target image and the number of searches for the each the second search queries; and selecting a predetermined number of the second search queries as the recommendation information in descending order of the number of searches.

In some embodiments, before the generating recommendation information based on the target image and the first search query, the method further includes: acquiring a log of switching between search queries, wherein the log includes a uniform resource locator corresponding to an image included in a historical detail page acquired based on historical first search query inputted by at least one historical user, and the second search query inputted by the at least one historical user when searching on the historical detail page; and determining a corresponding relationship between the uniform resource locator corresponding to the image in the log and the second search query inputted by the at least one historical user when searching on the historical detail page, and the number of searches for the second search query inputted by the at least one historical user when searching on the historical detail page, and generating the recommendation information table.

In some embodiments, the log includes at least one log data, and each piece of the log data includes the historical first search query, the uniform resource locator corresponding to the image, the at least one second search query, and time for searching; and after the acquiring a log of switching between search queries, the method further includes: performing at least one of the following operations on the log: filtering the log data in predetermined period from the log in response to the number of searches for a given search query by a given historical user within the predetermined period exceeding a predetermined first number threshold; filtering the log data in the predetermined period from the log in response to the number of searches for different search queries by the given historical user within the predetermined period exceeding a predetermined second number threshold; and merging the log data of searching for a given historical first search query and a given second search query by the given historical user within the predetermined period.

In some embodiments, after the acquiring a log of switching between search queries, the method further includes: determining, for the uniform resource locator corresponding to each of the images in the log, the at least one second search query inputted when searching on the detail page comprising the each of the images and the number of searches for the each the second search queries; deleting the log data having the confidence coefficient lower than a predetermined second confidence coefficient threshold; and deduplicating the log data including second search queries having a given semantic meaning.

In some embodiments, the method further includes: aggregating the log data corresponding to the images having given contents but different sizes or different resolutions to obtain similar content log data; determining, for the uniform resource locator corresponding to each of the images in the similar content log data, the at least one second search query inputted when searching on the detail page including the image and the number of searches for the each the second search queries, and generating a first recommendation information sub-table; aggregating the log data corresponding to the images having a given size, given contents, and a given resolution, but different uniform resource locators to obtain same content log data; determining, for the uniform resource locator corresponding to each of the images in the same content log data, the at least one second search query inputted when searching on the detail page including the each of the images and the number of searches for the each the second search queries, and generating a second recommendation information sub-table; determining, for the uniform resource locator corresponding to each of the images in unaggregated log data, the at least one second search query inputted when searching on the detail page including the each of the images and the number of searches for the each the second search queries, and generating a third recommendation information sub-table; and generating the recommendation information table based on the first recommendation information sub-table, the second recommendation information sub-table, and the third recommendation information sub-table.

In some embodiments, the querying at least one second search query and a number of searches for each the second search queries by using a preset recommendation information table includes: querying sequentially the number of searches for the each the second search queries in the first recommendation information sub-table, the second recommendation information sub-table, and the third recommendation information sub-table; the selecting a predetermined number of the second search queries as the recommendation information in descending order of the number of searches includes: weighting the number of searches for the each the second search queries based on a matching degree between a keyword in the first search query and the each the second search queries in the recommendation information table; and selecting the predetermined number of the second search queries as the recommendation information in descending order of the weighted number of searches.

In a second aspect, the embodiments of the present disclosure provide an apparatus for pushing information, including: a first searching unit, configured to send, in response to receiving first search query sent by a terminal, a search result page including at least one image matching the first search query to the terminal, for a user to select a to-be-browsed target image from the at least one image, the target image being linked to a detail page having a search function including the target image; a second searching unit, configured to acquire, in response to receiving a request for browsing the target image sent by the terminal, the detail page linked to the target image; a recommendation unit, configured to generate recommendation information based on the target image and the first search query, and add the recommendation information to the detail page; and a pushing unit, configured to push the detail page having the added recommendation information to the terminal.

In some embodiments, the recommendation unit is further configured to: recognize contents of the target image to obtain at least one text and a confidence coefficient of each of the at least one text; and determine, from the at least one text, the text different from the first search query and having the confidence coefficient greater than a predetermined first confidence coefficient threshold as the recommendation information.

In some embodiments, the recommendation unit is further configured to: query at least one second search query and a number of searches for each the second search queries by using a preset recommendation information table, wherein the recommendation information table is used to represent a corresponding relationship between the at least one second search query used in searching on the detail page including the target image and the number of searches for the each the second search queries; and select a predetermined number of the second search queries as the recommendation information in descending order of the number of searches.

In some embodiments, the apparatus further includes: an acquisition unit, configured to acquire a log of switching between search queries, wherein the log includes a uniform resource locator corresponding to an image included in a historical detail page acquired based on historical first search query inputted by at least one historical user, and the second search query inputted by the at least one historical user when searching on the historical detail page; and a generation unit, configured to determine a corresponding relationship between the uniform resource locator corresponding to the image in the log and the second search query inputted by the at least one historical user when searching on the historical detail page, and the number of searches for the second search query inputted by the at least one historical user when searching on the historical detail page, and generate the recommendation information table.

In some embodiments, the log includes at least one log data, and each piece of the log data includes the historical first search query, the uniform resource locator corresponding to the image, the at least one second search query, and time for searching; and the apparatus further includes a filtering unit, configured to, after the acquiring a log of switching between search queries, perform at least one of the following operations on the log: filter the log data in predetermined period from the log in response to the number of searches for a given search query by a given historical user within the predetermined period exceeding a predetermined first number threshold; filter the log data in the predetermined period from the log in response to the number of searches for different search queries by the given historical user within the predetermined period exceeding a predetermined second number threshold; and merge the log data of searching for a given historical first search query and a given second search query by the given historical user within the predetermined period.

In some embodiments, the apparatus further includes a statistics unit, configured to: determine, for the uniform resource locator corresponding to each of the images in the log, the at least one second search query inputted when searching on the detail page comprising the each of the images and the number of searches for the each the second search queries; delete the log data having the confidence coefficient lower than a predetermined second confidence coefficient threshold; and deduplicating the log data including second search queries having a given semantic meaning.

In some embodiments, the apparatus further includes an aggregation unit, configured to: aggregate the log data corresponding to the images having given contents but different sizes or different resolutions to obtain similar content log data; determine, for the uniform resource locator corresponding to each of the images in the similar content log data, the at least one second search query inputted when searching on the detail page including the each of the images and the number of searches for the each the second search queries, and generate a first recommendation information sub-table; aggregate the log data corresponding to the images having a given size, given contents, and a given resolution, but different uniform resource locators to obtain same content log data; determine, for the uniform resource locator corresponding to each of the images in the same content log data, the at least one second search query inputted when searching on the detail page including the each of the images and the number of searches for the each the second search queries, and generate a second recommendation information sub-table; determine, for the uniform resource locator corresponding to each of the images in unaggregated log data, the at least one second search query inputted when searching on the detail page including the each of the images and the number of searches for the each the second search queries, and generate a third recommendation information sub-table; and generate the recommendation information table based on the first recommendation information sub-table, the second recommendation information sub-table, and the third recommendation information sub-table.

In some embodiments, the recommendation unit is further configured to: query sequentially the number of searches for the each the second search queries in the first recommendation information sub-table, the second recommendation information sub-table, and the third recommendation information sub-table; and the selecting a predetermined number of the second search queries as the recommendation information in descending order of the number of searches includes: weight the number of searches for the each the second search queries based on a matching degree between a keyword in the first search query and the each the second search queries in the recommendation information table; and select the predetermined number of the second search queries as the recommendation information in descending order of the weighted number of searches.

In a third aspect, the embodiments of the present disclosure provide a server, including: one or more processors; and a storage apparatus, for storing one or more programs, the one or more programs, when executed by the one or more processors, cause the one or more processors to implement the method according to any one of the embodiments in the first aspect.

In a fourth aspect, the embodiments of the present disclosure provide a non-transitory computer readable storage medium, storing a computer program thereon, the program, when executed by a processor, implements the method according to any one of the embodiments in the first aspect.

The method and apparatus for pushing information provided by the embodiments of the present disclosure push a first search result page including the target image to the terminal by the first search query sent by the terminal, acquire a detail page linked to the target image after detecting that the user clicking on the target image, generate recommendation information combining the target image and the first search query, and finally add the recommendation information to the detail page and then send it to the terminal, thereby effectively utilizing the target image and the first search query to realize a targeted information push.

BRIEF DESCRIPTION OF THE DRAWINGS

After reading detailed descriptions of non-limiting embodiments with reference to the following accompanying drawings, other features, objectives and advantages of the present disclosure will become more apparent:

FIG. 2 is a flowchart of an embodiment of a method for pushing information according to the present disclosure;

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
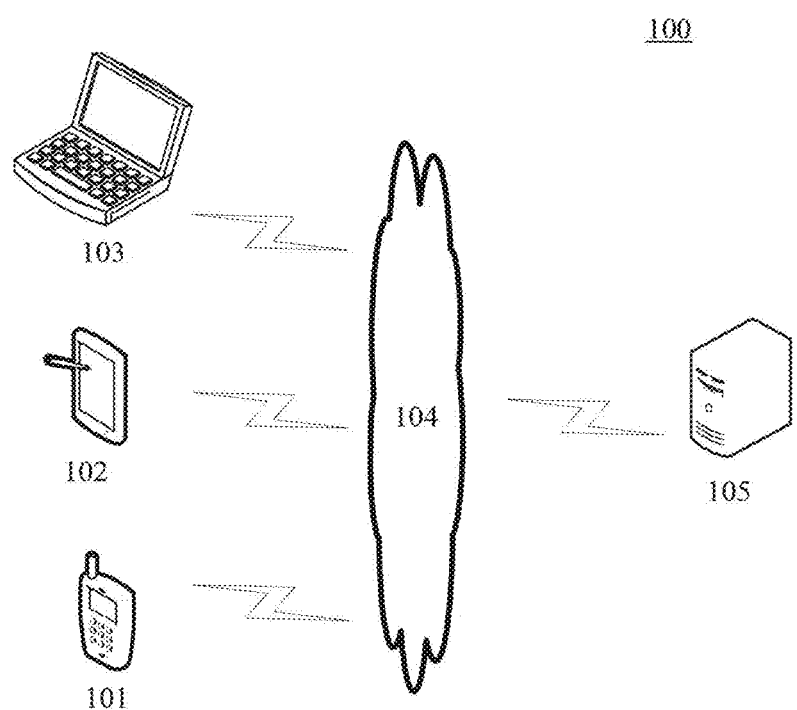
FIG. 1 is an exemplary system architecture diagram to which the present disclosure may be applied.

FIG. 1 shows an illustrative architecture of a system 100 which may be used by a method for pushing information or an apparatus for pushing information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102, and 103.

The terminal devices 101, 102, and 103 may be various electronic devices having a display and capable of browsing a webpage, including but not limited to, smart phones, tablet computers, e-book readers, MP3 (Moving Image Experts Group Audio Layer III) players, MP4 (Moving Image Experts Group Audio Layer IV) players, laptop computers, and desktop computers.

The server 105 may be a server providing various services, for example, a back end search server providing support to the webpage displayed on the terminal device 101, 102, or 103. The back end search server may perform corresponding processing on received data such as the search query, and return a processing result (for example, the search result page data) to the terminal device.

It should be noted that the method for pushing information according to the embodiments of the present application is generally executed by the server 105. Accordingly, an apparatus for pushing information is generally installed on the server 105.

It should be appreciated that the numbers of the terminal devices, the networks and the servers in FIG. 1 are merely illustrative. Any number of terminal devices, networks and servers may be provided based on the actual requirements.

With further reference to FIG. 2, a flow 200 of an embodiment of the method for pushing information according to the present disclosure is illustrated. The method for pushing information includes the following steps:

Step 201, sending, in response to receiving first search query sent by a terminal, a search result page including at least one image matching the first search query to the terminal, for a user to select a to-be-browsed target image from the at least one image.

Figure 3A:
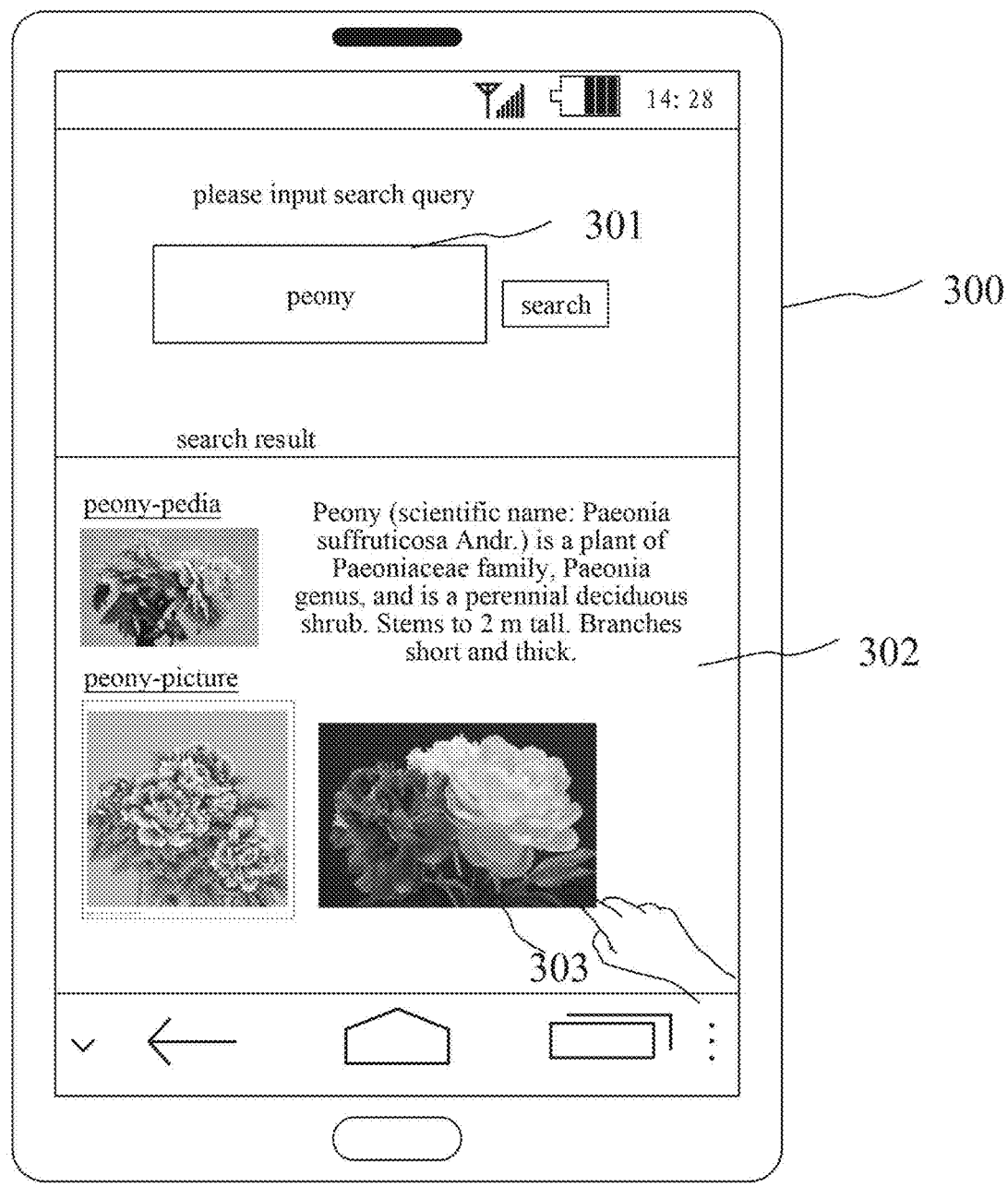
FIGS. 3*a*-3*b* are schematic diagrams of an application scenario of the method for pushing information according to the present disclosure.
Figure 3B:
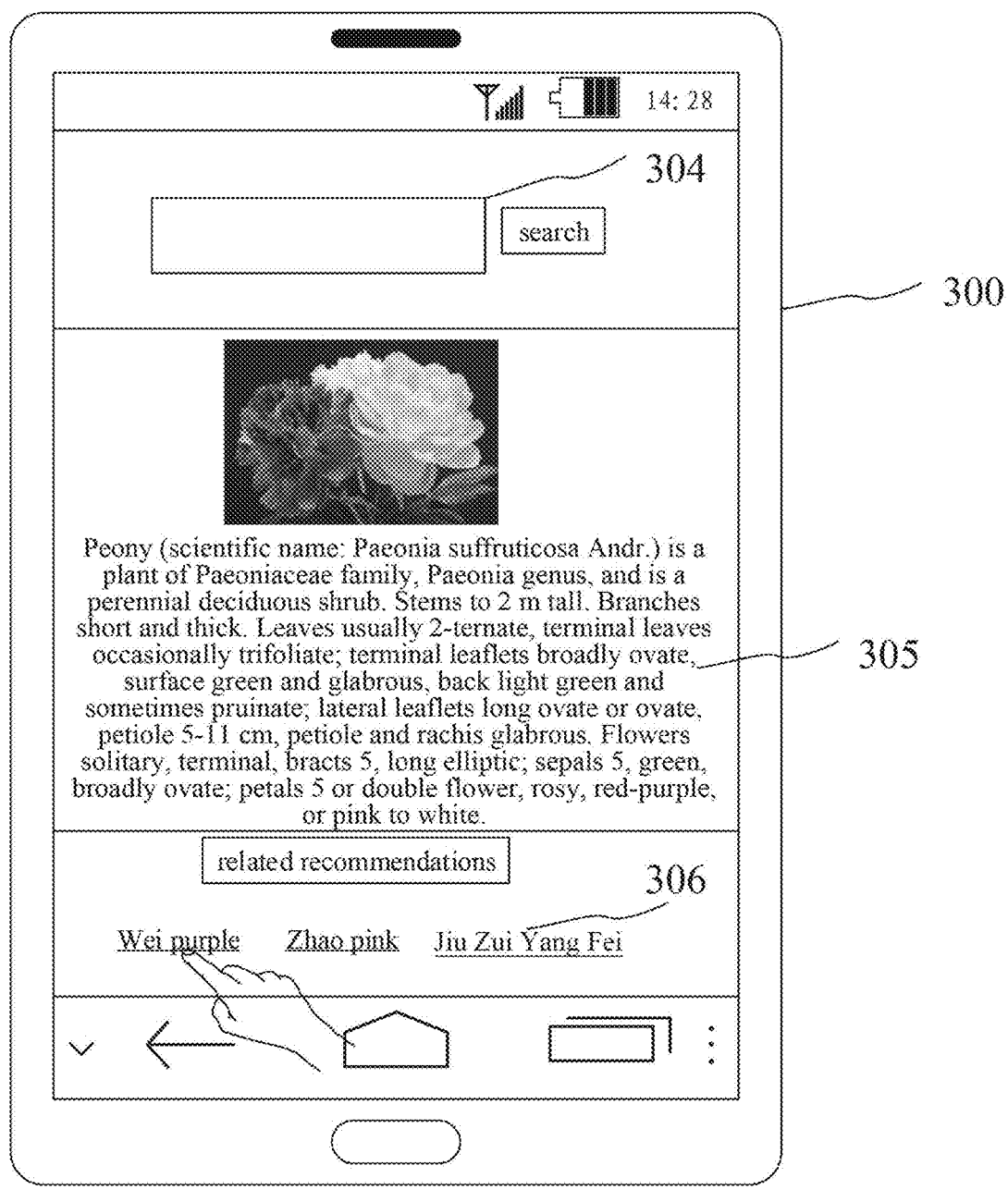

In the present embodiment, the electronic device (e.g., the server as shown in FIG. 1) on which the method for pushing information operate may receive first search query from a terminal with which the user performs an image search through a wired connection or a wireless connection. Here, the first search query may be a search keyword, an image, or a voice. The electronic device searches for image search results matching the first search query to generate a search result page. As shown in FIG. 3a, an image on the search result page may be linked to a detail page including the image and having a search function, as shown in FIG. 3b. Then, the search result page is returned to the terminal. The search result page includes at least one image, and the user may select an image in the search result page as the target image by clicking on the image through the terminal, as shown by 303 in FIG. 3a.

Step 202, acquiring, in response to receiving a request for browsing the target image sent by the terminal, the detail page linked to the target image.

In the present embodiment, after the user selects the target image to be browsed in the images of the search result page by clicking on the terminal, the terminal sends a request for browsing the target image to the server. The server receives the request for browsing the target image sent by the terminal, and acquires the detail page linked to the target image. The detail page has a search function in addition to including the target image. If the user is not satisfied with the first search result, second search query may be directly inputted on the detail page to search again.

Step 203, generating recommendation information based on the target image and the first search query, and adding the recommendation information to the detail page.

In the present embodiment, in order to facilitate the user to search on the detail page again, the recommendation information may be added to the detail page. The user only needs to click on the recommendation information to link to the corresponding search result page, and there is no need to manually input the second search query. Here, the second search query refers to the search query inputted on the detail page, which is different from the first search query inputted on the search result page. In order to improve the accuracy of the recommendation, the recommendation information is generated based on the target image and the first search query, so that the recommendation information is associated with the target image and the first search query, and the search range may be further narrowed.

In some alternative implementations of the present embodiment, the generating recommendation information based on the target image and the first search query, includes: recognizing contents of the target image to obtain at least one text and a confidence coefficient of each of the at least one text; and determining, from the at least one text, the text different from the first search query and having the confidence coefficient greater than a predetermined first confidence coefficient threshold as the recommendation information. The contents of the target image may be recognized by an image recognition algorithm, for example, the contents of the target image are recognized by a convolutional neural network. In the image recognition, the recognized at least one text and the confidence coefficient of each of the at least one text may be determined. Confidence coefficient indicates the degree of confidence in the judgment. In statistics, the probability that the error of the sampling index and the overall index not exceeding a given range (called the confidence interval) is referred to as the confidence coefficient of the sampling estimate. For example, the first search query is "peony," the peony in the target image is pink and purple, the text obtained after recognition includes "Wei purple," "Zhao pink," "Jiu Zui Yang Fei," "Bean green," and "Yu Yi yellow," and the confidence coefficients are 95%, 80%, 80%, 20%, and 30% respectively. For text with the confidence coefficient lower than a predetermined first confidence coefficient threshold, there is no reference significance and therefore the information may be ignored. If the first confidence coefficient threshold is set to be 80% in the above example, the recommendation information is "Wei purple," "Zhao pink," and "Jiu Zui Yang Fei." Alternatively, the target image may be sent to a third-party word-guessing server for image recognition. In order to reduce the network transmission cost, a predetermined number of images may be sent to the third-party word-guessing server each time.

In some alternative implementations of the present embodiment, the generating recommendation information based on the target image and the first search query, includes: querying at least one second search query and a number of searches for each the second search queries by using a preset recommendation information table, where the recommendation information table is used to represent a corresponding relationship between the at least one second search query used in searching on the detail page including the target image and the number of searches for the each the second search queries; and selecting a predetermined number of the second search queries as the recommendation information in descending order of the number of searches. The at least one second search query inputted by a historical user when searching on the detail page including the image and the number of searches for the each the second search queries are pre-counted. The number of searches refers to the number of times the search query is searched. For example, the search result page obtained after the first search query "peony" is inputted by the historical user includes a plurality of images. After clicking on one of the images and jumping to the detail page, the second search query inputted on the detail page is "Wei purple," "Zhao pink," "Jiu Zui Yang Fei," "Bean green," and "Yu Yi yellow," and the number of searches are 13,000 times, 8,000 times, 6006 times, 200 times, and 130 times respectively. If the predetermined number is three, the "Wei purple," "Zhao pink," and "Jiu Zui Yang Fei" with the highest number of searches are selected as the recommendation information, thereby improving the hit rate of the recommendation information.

Step 204, pushing the detail page having the added recommendation information to the terminal.

In the present embodiment, the server pushes the detail page having the added recommendation information to the terminal, and then the user may choose whether to search again based on the recommendation information.

With further reference to FIGS. 3a-3b, FIGS. 3a-3b are schematic diagrams of an application scenario of the method for pushing information according to the present embodiment. Here, FIG. 3a is a search result page and FIG. 3b is a detail page. In the application scenario of FIGS. 3a-3b, the user first initiates a search request including first search query 301 "peony" through a terminal 300; then, the search server may acquire from the back end a search result page 302 including at least one image that matches the first search query 301 and push it to the terminal 300; then, the search server receives a request sent by the terminal 300 for browsing a target image 303, and acquires a detail page 305 linked to the target image; finally, the search server may associate the target image with the first search query, and generate recommendation information 306 "Wei purple," "Zhao pink," and "Jiu Zui Yang Fei" and add them to the detail page. The user may select the recommendation information 306 for further searching.

The method provided by the above embodiments of the present disclosure realizes targeted information push by associating the target image with the first search query.

Figure 4:
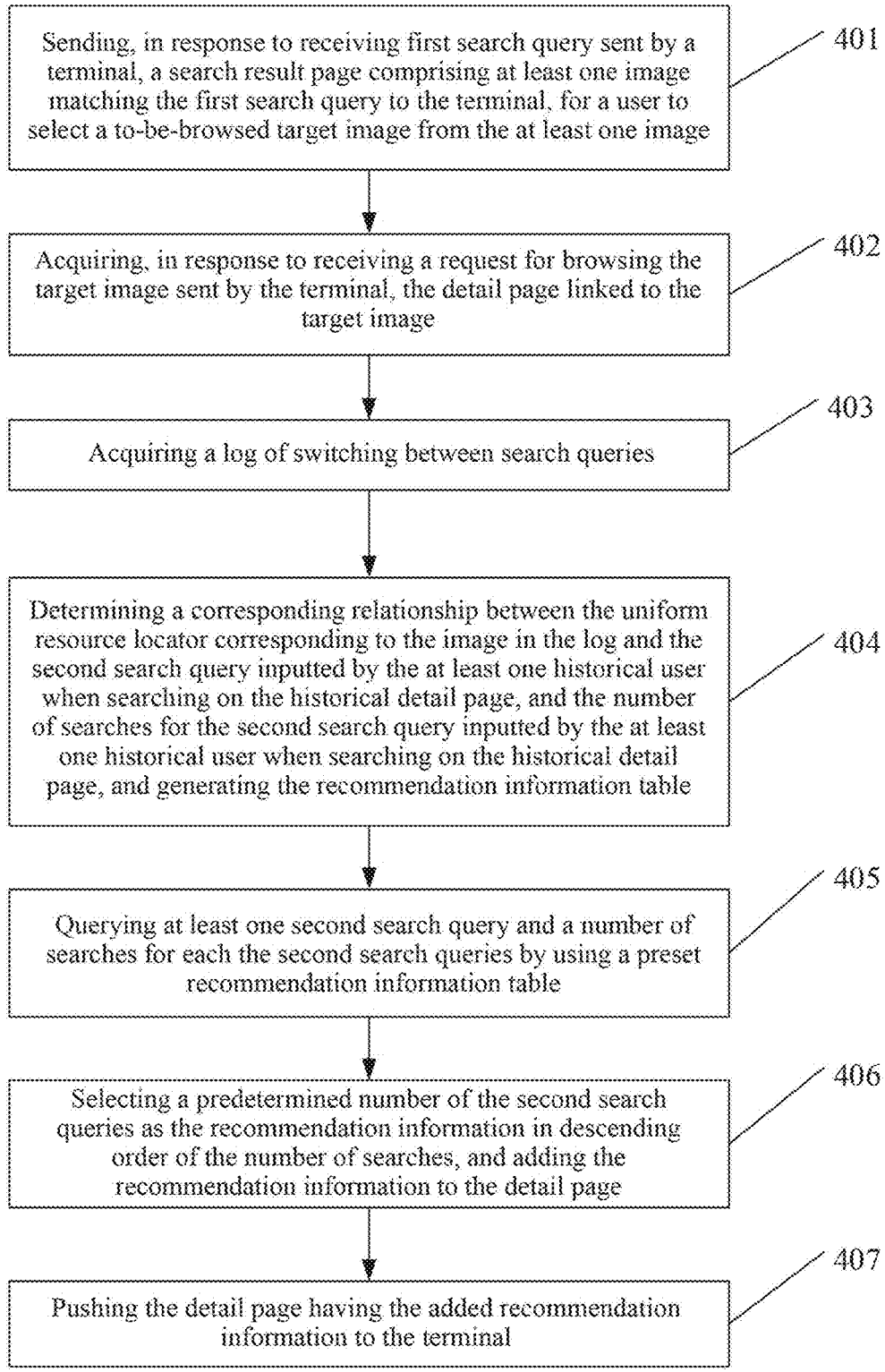
FIG. 4 is a flowchart of another embodiment of the method for pushing information according to the present disclosure.

With further reference to FIG. 4, a flow 400 of another embodiment of the method for pushing information is illustrated. The flow 400 of the method for pushing information includes the following steps:

Step 401, sending, in response to receiving first search query sent by a terminal, a search result page including at least one image matching the first search query to the terminal, for a user to select a to-be-browsed target image from the at least one image.

Step 401 is substantially the same as step 201, and therefore detailed description thereof will be omitted.

Step 402, acquiring, in response to receiving a request for browsing the target image sent by the terminal, the detail page linked to the target image.

Step 402 is substantially the same as step 202, and therefore detailed description thereof will be omitted.

Step 403, acquiring a log of switching between search queries.

In the present embodiment, the log of switching between search queries includes a uniform resource locator corresponding to an image included in a historical detail page acquired based on historical first search query inputted by at least one historical user, and the second search query inputted by the at least one historical user when searching on the historical detail page. As shown in FIG. 3b, all users may input the second search query on the detail page to search again. The log of switching between search queries is used to record the process in which each user jumps to the detail page after clicking on the target image and then searches again in the past time period. The uniform resource locator is used in the log to record the image, and the second search query used by all the users when searching again on the historical detail page including the image is recorded. Different users may be distinguished by user IDs, which may be login accounts of the search engine, or information that may be used to distinguish the users such as terminal device information.

Step 404, determining a corresponding relationship between the uniform resource locator corresponding to the image in the log and the second search query inputted by the at least one historical user when searching on the historical detail page, and the number of searches for the second search query inputted by the at least one historical user when searching on the historical detail page, and generating the recommendation information table.

In the present embodiment, which second search query inputted by the at least one historical user when searching on the historical detail page is associated with the uniform resource locators can be determined from the log, so that the corresponding relationship between the images and the second search query inputted by the at least one historical user when searching on the historical detail page, and the number of searches for the second search query may be determined. The log of switching between search queries may be directly used for statistics, or the log of switching between search queries may be optimized before the statistics.

In some alternative implementations of the present embodiment, the log includes at least one log data, and each piece of the log data includes the historical first search query, the uniform resource locator corresponding to the image, the at least one second search query, and time for searching. After the acquiring a log of switching between search queries, the method further includes: performing at least one of the following operations on the log for anti-cheat processing:

1. If the number of searches for a given search query by a given historical user within a predetermined period exceeds a predetermined first number threshold, the log data in the predetermined period is filtered from the log. Here, the search query may be at least one of the first search query or the second search query. For example, in the log data including the same user ID, if a given keyword is searched for 100 times in one day, which exceeds the first number threshold 50, the behavior of the user is considered abnormal on the day, and the search history of the user on the day is filtered out when the number of searches is counted.

2. If the number of searches for different search queries by the given historical user within the predetermined period exceeds a predetermined second number threshold, the log data in the predetermined period is filtered from the log. Here, the search query may be at least one of the first search query or the second search query. For example, in the log data including the same user ID, if different keywords are searched for 10000 times in one day, which exceeds the second number threshold 500, the behavior of the user is considered abnormal on the day, and the search history of the user on the day is filtered out when the number of searches is counted.

3. Pieces of the log data of searching for a given historical first search query and a given second search query by the given historical user within the predetermined period are merged. For example, in the log data including the same user ID, if the given historical first search query and the given second search query are searched for multiple times in one day, the number of searches is counted only once.

In some alternative implementations of the present embodiment, after the acquiring a log of switching between search queries, the method further includes: determining, for the uniform resource locator corresponding to each of the images in the log, the at least one second search query inputted when searching on the detail page including the each of the images and the number of searches for the each the second search queries; deleting the log data having the confidence coefficient lower than a predetermined second confidence coefficient threshold; and deduplicating the log data including second search queries having a given semantic meaning. Here, the confidence coefficient refers to the credibility of the log data. If the log data is abnormal, the credibility is considered low. For example, if a given second search query is searched for 1 billion times by 100 million users, the log data is considered untrustworthy and filtered out. The given semantic meaning means that the keywords are different but express the same meaning. For example, the keywords are "Water lily" and "Lotus." Although the words are different, they actually express the same meaning, i.e., the keywords have the same semantic meaning. It is also possible to filter out some meaningless characters in the search query and then perform semantics judgment. For example, "Li!!" and "Li" have the same semantic meaning.

In some alternative implementations of the present embodiment, the method further includes:

1. Aggregating the log data corresponding to the images having given contents but different sizes or different resolutions to obtain similar content log data; determining, for the uniform resource locator corresponding to each of the images in the similar content log data, the at least one second search query inputted when searching on the detail page including the each of the images and the number of searches for the each the second search queries, and generating a first recommendation information sub-table. If there is no image having similar contents in the log, the first recommendation information sub-table is empty.

2. Aggregating the log data corresponding to the images having a given size, given contents, and a given resolution, but different uniform resource locators to obtain same content log data; determining, for the uniform resource locator corresponding to each of the images in the same content log data, the at least one second search query inputted when searching on the detail page including the each of the images and the number of searches for the each the second search queries, and generating a second recommendation information sub-table. If there is no image having same contents in the log, the second recommendation information sub-table is empty.

3. Determining, for the uniform resource locator corresponding to each of the images in unaggregated log data, the at least one second search query inputted when searching on the detail page including the each of the images and the number of searches for the each the second search queries, and generating a third recommendation information sub-table.

4. Generating the recommendation information table based on the first recommendation information sub-table, the second recommendation information sub-table, and the third recommendation information sub-table. One or two sub-tables may be empty in the first recommendation information sub-table, the second recommendation information sub-table, and the third recommendation information sub-table.

Step 405, querying at least one second search query and a number of searches for each the second search queries by using a preset recommendation information table.

In the present embodiment, the at least one second search query corresponding to the first search query in the first recommendation information sub-table, the second recommendation information sub-table, and the third recommendation information sub-table, and the number of searches for the each the second search queries are queried sequentially. The priority of the first recommendation information sub-table is higher than that of the second recommendation information sub-table, and the priority of the second recommendation information sub-table is higher than that of the third recommendation information sub-table. If the second search query corresponding to the first search query can be found in the first recommendation information sub-list, the second recommendation information sub-table and the third recommendation information sub-table are no longer searched; otherwise, the second recommendation information sub-table is searched next. If the first search query is not found in the first recommendation information sub-table and the second recommendation information sub-table, then the third recommendation information sub-table is searched next.

Step 406, selecting a predetermined number of the second search queries as the recommendation information in descending order of the number of searches, and adding the recommendation information to the detail page.

In the present embodiment, the number of searches for the each the second search queries is weighted based on a matching degree between a keyword in the first search query and the each the second search queries in the recommendation information table; and the predetermined number of the second search queries are selected as the recommendation information in descending order of the weighted number of searches. For example, the number of searches is weighted by the following formula:

$$\Sigma \text{term\_weight}_i * \log(\text{num}+1) \qquad \text{(Formula one)}$$

The term_weight is the matching degree between each keyword in the first search query and the second search query, which reflects the importance of the keyword in the second search query, and i is the number of keywords in the first search query. Num is the number of searches for the second search query including the keyword.

Step 407, pushing the detail page having the added recommendation information to the terminal.

Step 407 is substantially the same as step 204, and therefore detailed description thereof will be omitted.

As can be seen from FIG. 4, the flow 400 of the method for pushing information in the present embodiment highlights the step of determining the recommendation information by the number of searches for the second search query in the log, as compared with the embodiment corresponding to FIG. 2. Therefore, the solution described in the present embodiment may introduce more recommendation information related data, thereby realizing a more comprehensive selection of the recommendation information and a more effective information push.

Figure 5:
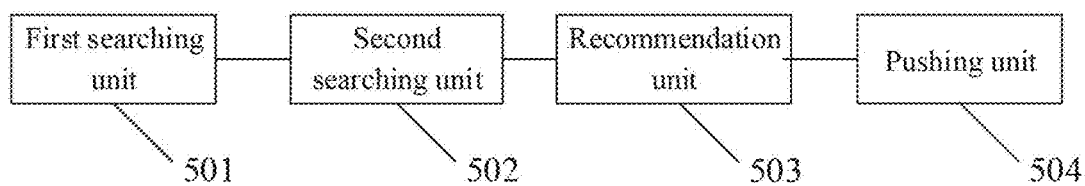
FIG. 5 is a schematic structural diagram of an embodiment of an apparatus for pushing information according to the present disclosure.

With further reference to FIG. 5, as an implementation to the method shown in the above figures, the present disclosure provides an embodiment of an apparatus for pushing information. The apparatus embodiment corresponds to the method embodiment shown in FIG. 2, and the apparatus may specifically be applied to various electronic devices.

As shown in FIG. 5, the apparatus 500 for pushing information of the present embodiment includes: a first searching unit 501, a second searching unit 502, a recommendation unit 503 and a pushing unit 504. Here, the first searching unit 501 is configured to send, in response to receiving first search query sent by a terminal, a search result page including at least one image matching the first search query to the terminal, for a user to select a to-be-browsed target image from the at least one image, the target image being linked to a detail page having a search function including the target image; the second searching unit 502, configured to acquire, in response to receiving a request for browsing the target image sent by the terminal, the detail page linked to the target image; a recommendation unit 503, configured to generate recommendation information based on the target image and the first search query, and add the recommendation information to the detail page; and a pushing unit 504, configured to push the detail page having the added recommendation information to the terminal.

In the present embodiment, the specific processing of the first searching unit 501, the second searching unit 502, the recommendation unit 503 and the pushing unit 504 of the apparatus 500 for pushing information may be referred to step 201, step 202, step 203, and step 204 in the embodiment corresponding to FIG. 2.

In some alternative implementations of the present embodiment, the recommendation unit 503 is further configured to: recognize contents of the target image to obtain at least one text and a confidence coefficient of each of the at least one text; and determine, from the at least one text, the text different from the first search query and having the confidence coefficient greater than a predetermined first confidence coefficient threshold as the recommendation information.

In some alternative implementations of the present embodiment, the recommendation unit 503 is further configured to: query at least one second search query and a number of searches for each the second search queries by using a preset recommendation information table, wherein the recommendation information table is used to represent a corresponding relationship between the at least one second search query used in searching on the detail page including the target image and the number of searches for the each the second search queries; and select a predetermined number of the second search queries as the recommendation information in descending order of the number of searches.

In some alternative implementations of the present embodiment, the apparatus 500 further includes: an acquisition unit (not shown), configured to acquire a log of switching between search queries, wherein the log includes a uniform resource locator corresponding to an image included in a historical detail page acquired based on historical first search query inputted by at least one historical user, and the second search query inputted by the at least one historical user when searching on the historical detail page; and a generation unit (not shown), configured to determine a corresponding relationship between the uniform resource locator corresponding to the image in the log and the second search query and a number of searches for the second search query and generate the recommendation information table.

In some alternative implementations of the present embodiment, the log includes at least one log data, and each piece of the log data includes the historical first search query, the uniform resource locator corresponding to the image, the at least one second search query, and time for searching; and the apparatus 500 further includes a filtering unit (not shown), configured to, after the acquiring a log of switching between search queries, perform at least one of the following operations on the log: filter the log data in predetermined period from the log in response to the number of searches for a given search query by a given historical user within the predetermined period exceeding a predetermined first number threshold; filter the log data in the predetermined period from the log in response to the number of searches for different search queries by the given historical user within the predetermined period exceeding a predetermined second number threshold; and merge the log data of searching for a given historical first search query and a given second search query by the given historical user within the predetermined period.

In some alternative implementations of the present embodiment, the apparatus 500 further includes a statistics unit (not shown), configured to: determine, for the uniform resource locator corresponding to each of the images in the log, the at least one second search query inputted when searching on the detail page including the each of the images and the number of searches for the each the second search queries; delete the log data having the confidence coefficient lower than a predetermined second confidence coefficient threshold; and deduplicate the log data including second search queries having a given semantic meaning.

In some alternative implementations of the present embodiment, the apparatus 500 further includes an aggregation unit (not shown), configured to: aggregate the log data corresponding to the images having given contents but different sizes or different resolutions to obtain similar content log data; determine, for the uniform resource locator corresponding to each of the images in the similar content log data, the at least one second search query inputted when searching on the detail page including the each of the images and the number of searches for the each the second search queries, and generate a first recommendation information sub-table; aggregate the log data corresponding to the images having a given size, given contents, and a given resolution, but different uniform resource locators to obtain same content log data; determine, for the uniform resource locator corresponding to each of the images in the same content log data, the at least one second search query inputted when searching on the detail page including the each of the images and the number of searches for the each the second search queries, and generate a second recommendation information sub-table; determine, for the uniform resource locator corresponding to each of the images in unaggregated log data, the at least one second search query inputted when searching on the detail page including the each of the images and the number of searches for the each the second search queries, and generate a third recommendation information sub-table; and generate the recommendation information table based on the first recommendation information sub-table, the second recommendation information sub-table, and the third recommendation information sub-table.

In some alternative implementations of the present embodiment, the recommendation unit 503 is further configured to: query sequentially the number of searches for the each the second search queries in the first recommendation information sub-table, the second recommendation information sub-table, and the third recommendation information sub-table; and the selecting a predetermined number of the second search queries as the recommendation information in descending order of the number of searches includes: weight the number of searches for the each the second search queries based on a matching degree between a keyword in the first search query and the each the second search queries in the recommendation information table; and select the predetermined number of the second search queries as the recommendation information in descending order of the weighted number of searches.

Figure 6:
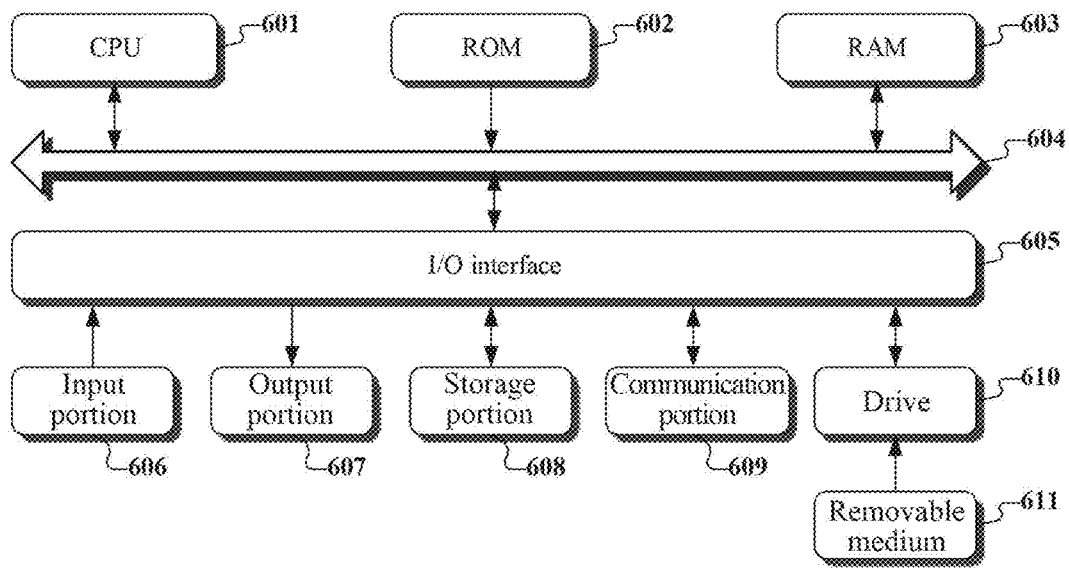
FIG. 6 is a schematic structural diagram of a computer system adapted to implement a server of the embodiments of the present disclosure.

Referring to FIG. 6, a schematic structural diagram of a computer system 600 adapted to implement a terminal device or a server of the embodiments of the present application is shown. The driving control device shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/ output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a first searching unit, a second searching unit, a recommendation unit, and a pushing unit, where the names of these units or modules do not in some cases constitute a limitation to such units or modules themselves. For example, the first searching unit may also be described as "a unit for sending, in response to receiving first search query sent by a terminal, a search result page comprising at least one image matching the first search query to the terminal, for a user to select a to-be-browsed target image from the at least one image."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: send, in response to receiving first search query sent by a terminal, a search result page comprising at least one image matching the first search query to the terminal, for a user to select a to-be-browsed target image from the at least one image, the target image being linked to a detail page having a search function comprising the target image; acquire, in response to receiving a request for browsing the target image sent by the terminal, the detail page linked to the target image; generate recommendation information based on the target image and the first search query, and add the recommendation information to the detail page; and push the detail page having the added recommendation information to the terminal.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for pushing information, the method comprising:
   sending, in response to receiving a first search query sent by a terminal, a search result page comprising at least one image matching the first search query to the terminal, for a user to select a target image to-be-browsed from the at least one image, the target image being linked to a detail page having a search function comprising the target image, wherein the search function of the detailed page allows the user to input a second search query on the detail page for search;
   acquiring, in response to receiving a request for browsing the target image sent by the terminal, the detail page to which the target image linked;
   generating recommendation information based on the target image and the first search query, and adding the recommendation information to the detail page; and
   pushing the detail page having the added recommendation information to the terminal;
   wherein the generating recommendation information based on the target image and the first search query comprises:
   querying at least one second search query and a number of searches for each the second search queries by using a preset recommendation information table, wherein the recommendation information table is used to represent a corresponding relationship between the at least one second search query used in searching on the detail page comprising the target image and the number of searches for the each the second search queries; and
   selecting a predetermined number of the second search queries as the recommendation information in descending order of the number of searches.

2. The method according to claim 1, wherein the generating recommendation information based on the target image and the first search query comprises:
   recognizing contents of the target image to obtain at least one text and a confidence coefficient of each of the at least one text; and
   determining, from the at least one text, the text different from the first search query and having the confidence coefficient greater than a predetermined first confidence coefficient threshold as the recommendation information.

3. The method according to claim 1, wherein before the generating recommendation information based on the target image and the first search query, the method further comprises:
   acquiring a log of switching between search queries, wherein the log comprises a uniform resource locator corresponding to an image included in a historical detail page acquired based on historical first search query inputted by at least one historical user, and a second search query inputted by the at least one historical user when searching on the historical detail page; and
   determining a corresponding relationship between the uniform resource locator corresponding to the image in the log and the second search query inputted by the at least one historical user when searching on the historical detail page, and a number of searches for the second search query inputted by the at least one historical user when searching on the historical detail page, and generating the recommendation information table.

4. The method according to claim 3, wherein the log comprises at least one log data, and each piece of the log data comprises the historical first search query, the uniform resource locator corresponding to the image, the at least one second search query, and time for searching; and
   after the acquiring a log of switching between search queries, the method further comprises:
   performing at least one of following operations on the log:
   filtering the log data in predetermined period from the log in response to a number of searches for a given search query by a given historical user within the predetermined period exceeding a predetermined first number threshold;
   filtering the log data in the predetermined period from the log in response to a number of searches for different search queries by the given historical user within the predetermined period exceeding a predetermined second number threshold; and
   merging the log data of searching for a given historical first search query and a given second search query by the given historical user within the predetermined period.

5. The method according to claim 4, wherein after the acquiring a log of switching between search queries, the method further comprises:
   determining, for the uniform resource locator corresponding to each of the images in the log, the at least one second search query inputted when searching on the detail page comprising the each of the images and the number of searches for the each the second search queries;
   deleting the log data having a confidence coefficient lower than a predetermined second confidence coefficient threshold; and
   deduplicating the log data comprising second search queries having a given semantic meaning.

6. The method according to claim 5, wherein the method further comprises:
   aggregating the log data corresponding to the images having given contents but different sizes or different resolutions to obtain similar content log data;
   determining, for the uniform resource locator corresponding to each of the images in the similar content log data, the at least one second search query inputted when searching on the detail page comprising the each of the images and the number of searches for the each the second search queries, and generating a first recommendation information sub-table;
   aggregating the log data corresponding to the images having a given size, given contents, and a given resolution, but different uniform resource locators to obtain same content log data;

determining, for the uniform resource locator corresponding to each of the images in the same content log data, the at least one second search query inputted when searching on the detail page comprising the each of the images and the number of searches for the each the second search queries, and generating a second recommendation information sub-table;

determining, for the uniform resource locator corresponding to each of the images in unaggregated log data, the at least one second search query inputted when searching on the detail page comprising the each of the images and the number of searches for the each the second search queries, and generating a third recommendation information sub-table; and generating the recommendation information table based on the first recommendation information sub-table, the second recommendation information sub-table, and the third recommendation information sub-table.

7. The method according to claim 6, wherein the querying at least one second search query and a number of searches for each the second search queries by using a preset recommendation information table comprises:

querying sequentially the number of searches for the each the second search queries in the first recommendation information sub-table, the second recommendation information sub-table, and the third recommendation information sub-table; and the selecting a predetermined number of the second search queries as the recommendation information in descending order of the number of searches comprises:

weighting the number of searches for the each the second search queries based on a matching degree between a keyword in the first search query and the each the second search queries in the recommendation information table; and selecting the predetermined number of the second search queries as the recommendation information in descending order of the weighted number of searches.

8. An apparatus for pushing information, the apparatus comprising:

at least one processor; and a memory storing instructions, the instructions when executed by the at least one processor, cause the at least one processor to perform operations, the operations comprising:

sending, in response to receiving a first search query sent by a terminal, a search result page comprising at least one image matching the first search query to the terminal, for a user to select a target image to be browsed from the at least one image, the target image being linked to a detail page having a search function comprising the target image, wherein the search function of the detailed page allows the user to input a second search query on the detail page for search;

acquiring, in response to receiving a request for browsing the target image sent by the terminal, the detail page to which the target image linked;

generating recommendation information based on the target image and the first search query, and adding the recommendation information to the detail page; and pushing the detail page having the added recommendation information to the terminal;

wherein the generating recommendation information based on the target image and the first search query comprises:

querying at least one second search query and a number of searches for each the second search queries by using a preset recommendation information table, wherein the recommendation information table is used to represent a corresponding relationship between the at least one second search query used in searching on the detail page comprising the target image and the number of searches for the each the second search queries; and selecting a predetermined number of the second search queries as the recommendation information in descending order of the number of searches.

9. The apparatus according to claim 8, wherein the generating recommendation information based on the target image and the first search query comprises:

recognizing contents of the target image to obtain at least one text and a confidence coefficient of each of the at least one text; and determining, from the at least one text, the text different from the first search query and having the confidence coefficient greater than a predetermined first confidence coefficient threshold as the recommendation information.

10. The apparatus according to claim 9, wherein before the generating recommendation information based on the target image and the first search query, the operations further comprise:

acquiring a log of switching between search queries, wherein the log comprises a uniform resource locator corresponding to an image included in a historical detail page acquired based on historical first search query inputted by at least one historical user, and a second search query inputted by the at least one historical user when searching on the historical detail page; and determining a corresponding relationship between the uniform resource locator corresponding to the image in the log and the second search query inputted by the at least one historical user when searching on the historical detail page, and a number of searches for the second search query inputted by the at least one historical user when searching on the historical detail page, and generate the recommendation information table.

11. The apparatus according to claim 10, wherein the log comprises at least one log data, and each piece of the log data comprises the historical first search query, the uniform resource locator corresponding to the image, the at least one second search query, and time for searching; and after the acquiring a log of switching between search queries, the operations further comprise:

filtering the log data in predetermined period from the log in response to a number of searches for a given search query by a given historical user within the predetermined period exceeding a predetermined first number threshold;

filtering the log data in the predetermined period from the log in response to a number of searches for different search queries by the given historical user within the predetermined period exceeding a predetermined second number threshold; and merging the log data of searching for a given historical first search query and a given second search query by the given historical user within the predetermined period.

12. The apparatus according to claim 11, wherein after the acquiring a log of switching between search queries, the operations further comprise:

determining, for the uniform resource locator corresponding to each of the images in the log, the at least one second search query inputted when searching on the detail page comprising the each of the images and the number of searches for the each the second search queries;

deleting the log data having a confidence coefficient lower than a predetermined second confidence coefficient threshold; and deduplicating the log data comprising second search queries having a given semantic meaning.

13. The apparatus according to claim 12, wherein the operations further comprise:

aggregating the log data corresponding to the images having given contents but different sizes or different resolutions to obtain similar content log data;

determining, for the uniform resource locator corresponding to each of the images in the similar content log data, the at least one second search query inputted when searching on the detail page comprising the each of the images and the number of searches for the each the second search queries, and generating a first recommendation information sub-table;

aggregating the log data corresponding to the images having a given size, given contents, and a given resolution, but different uniform resource locators to obtain same content log data;

determining, for the uniform resource locator corresponding to each of the images in the same content log data, the at least one second search query inputted when searching on the detail page comprising the each of the images and the number of searches for the each the second search queries, and generating a second recommendation information sub-table;

determining, for the uniform resource locator corresponding to each of the images in unaggregated log data, the at least one second search query inputted when searching on the detail page comprising the each of the images and the number of searches for the each the second search queries, and generating a third recommendation information sub-table; and generating the recommendation information table based on the first recommendation information sub-table, the second recommendation information sub-table, and the third recommendation information sub-table.

14. The apparatus according to claim 13, wherein the querying at least one second search query and a number of searches for each the second search queries by using a preset recommendation information table comprises:

querying sequentially the number of searches for the each the second search queries in the first recommendation information sub-table, the second recommendation information sub-table, and the third recommendation information sub-table; and the selecting a predetermined number of the second search queries as the recommendation information in descending order of the number of searches comprises:

weighting the number of searches for the each the second search queries based on a matching degree between a keyword in the first search query and the each the second search queries in the recommendation information table; and selecting the predetermined number of the second search queries as the recommendation information in descending order of the weighted number of searches.

15. A non-transitory computer-readable storage medium storing a computer program, the computer program when executed by one or more processors, causes the one or more processors to perform operations, the operations comprising:

sending, in response to receiving a first search query sent by a terminal, a search result page comprising at least one image matching the first search query to the terminal, for a user to select a target image to be browsed from the at least one image, the target image being linked to a detail page having a search function comprising the target image, wherein the search function of the detailed page allows the user to input a second search query on the detail page for search;

acquiring, in response to receiving a request for browsing the target image sent by the terminal, the detail page to which the target image linked;

generating recommendation information based on the target image and the first search query, and adding the recommendation information to the detail page; and pushing the detail page having the added recommendation information to the terminal;

wherein the generating recommendation information based on the target image and the first search query comprises:

querying at least one second search query and a number of searches for each the second search queries by using a preset recommendation information table, wherein the recommendation information table is used to represent a corresponding relationship between the at least one second search query used in searching on the detail page comprising the target image and the number of searches for the each the second search queries; and selecting a predetermined number of the second search queries as the recommendation information in descending order of the number of searches.

* * * * *